(12) United States Patent
Lee et al.

(10) Patent No.: US 9,997,951 B2
(45) Date of Patent: *Jun. 12, 2018

(54) WIRELESS POWER TRANSFER METHOD, APPARATUS AND SYSTEM FOR LOW AND MEDIUM POWER

(71) Applicant: LG ELECTRONICS INC., Seoul (KR)

(72) Inventors: Jihyun Lee, Seoul (KR); Hyunbeom Lee, Seoul (KR); Yongcheol Park, Seoul (KR); Jaesung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

This patent is subject to a terminal disclaimer.

(21) Appl. No.: 15/018,946

(22) Filed: Feb. 9, 2016

(65) Prior Publication Data
US 2016/0172895 A1 Jun. 16, 2016

Related U.S. Application Data

(63) Continuation of application No. 13/936,897, filed on Jul. 8, 2013, now Pat. No. 9,287,039.
(Continued)

(30) Foreign Application Priority Data

Jul. 2, 2013 (KR) .................. 10-2013-0077368

(51) Int. Cl.
*H02J 7/02* (2016.01)
*H01F 38/14* (2006.01)
(Continued)

(52) U.S. Cl.
CPC .............. *H02J 7/025* (2013.01); *H01F 38/14* (2013.01); *H02J 7/042* (2013.01); *H02J 17/00* (2013.01);
(Continued)

(58) Field of Classification Search
CPC .......... H02J 7/025; H02J 5/005; H02J 5/0031; H02J 5/0004; H02J 50/80; H02J 50/10;
(Continued)

(56) References Cited

U.S. PATENT DOCUMENTS

2010/0176659 A1 7/2010 Aoyama et al.
2011/0149606 A1 6/2011 Ho et al.
(Continued)

FOREIGN PATENT DOCUMENTS

CN 1764118 4/2006
CN 102130514 7/2011
(Continued)

OTHER PUBLICATIONS

Vinnikov, Dmitri et al.; "Feasibility Study of Half- and Full-Bridge Isolated DC/DC Converters in High-Voltage High-Power Applications"; 2008—13$^{th}$ International Power Electronics and Motion Control Conference (EPE-PEMC 2008); Dec. 31, 2008; pp. 1257-1262.
(Continued)

*Primary Examiner* — Stacy Whitmore
(74) *Attorney, Agent, or Firm* — Ked & Associates, LLP

(57) ABSTRACT

A wireless power transfer method for a wireless power transfer apparatus using full and half-bridge inverter topologies includes detecting whether or not a wireless power receiver is present within a range of power being transferrable in a wireless manner, transmitting a detection signal to the wireless power receiver, receiving at least one of identification information and setting information from the wireless power receiver, receiving a control error packet from the wireless power receiver, and controlling an amount of power to be transferred by using the combination of a driving frequency, a duty cycle or a power signal phase to the full or half-bridge inverter.

14 Claims, 23 Drawing Sheets

Related U.S. Application Data

(60) Provisional application No. 61/669,504, filed on Jul. 9, 2012, provisional application No. 61/815,126, filed on Apr. 23, 2013.

(51) Int. Cl.
| | |
|---|---|
| *H02J 17/00* | (2006.01) |
| *H02J 7/04* | (2006.01) |
| *H02J 50/12* | (2016.01) |
| *H02J 50/90* | (2016.01) |
| *H02J 50/10* | (2016.01) |
| *H02J 50/80* | (2016.01) |
| *H02J 5/00* | (2016.01) |
| *H04B 5/00* | (2006.01) |

(52) U.S. Cl.
CPC .............. *H02J 50/10* (2016.02); *H02J 50/12* (2016.02); *H02J 50/80* (2016.02); *H02J 50/90* (2016.02); *H02J 5/005* (2013.01); *H04B 5/0037* (2013.01)

(58) Field of Classification Search
CPC .... H02J 38/14; H02J 7/00; H02J 50/90; H02J 50/12; H02J 7/042; H04B 5/0037
USPC ......................................................... 320/108
See application file for complete search history.

(56) References Cited

U.S. PATENT DOCUMENTS

| | | |
|---|---|---|
| 2012/0068548 A1 | 3/2012 | Endo et al. |
| 2012/0161539 A1 | 6/2012 | Kim et al. |
| 2013/0147280 A1 | 6/2013 | Oettinger |
| 2015/0155918 A1 | 6/2015 | Van Wageningen |

FOREIGN PATENT DOCUMENTS

| | | |
|---|---|---|
| JP | 2012-105458 | 5/2012 |
| KR | 10-2010-0012944 | 2/2010 |
| WO | WO 2011/127449 | 10/2011 |
| WO | WO 2012/049582 A1 | 4/2012 |

OTHER PUBLICATIONS

Chinese Office Action dated Feb. 28, 2015 issued in Application No. 201310375830.8 (with English translation).

U.S. Office Action dated Jun. 25, 2015 issued in U.S. Appl. No. 13/936,897.

Daniel Teninty et al: "7575 Fulton Street East—MS Wireless Power Consortium"; Nov. 2, 2010 (Nov. 2, 2010); XP055088429; Retrieved from the Internet: URL:http//www.energy.ca.gov/appliances/battery_chargers/documents/2010-10-11_workshop/comments/Wireless%20Power%20Consortium%20Comments_TN%2058928.pdf [retrieved on Nov. 14, 2013]; pp. 36, 37 and 59.

European Search Report dated Feb. 2, 2016 issued in Application No. 13175554.8.

"System Description Wireless Power Transfer"; vol. I: Low Power, Part I: Interface Definition; Version 1.01; The Wireless Power Consortium; http://www.energy.ca.gov/application/batteries/documents/2010-1-0-11_workshop/comments/Wireless%20Power%20Consortium%20Comments_TN%2058928.pdf; pp. 1-86; Oct. 31, 2010.

Chinese Office Action dated May 31, 2017 issued in Application No. 201510652034.3 (English translation attached).

(a)

(b)

(c)

OPERATION PHASES

SIGNAL STRENGTH PACKET

FIG. 22

|    | b7 | b6 | b5 | b4 | b3 | b2 | b1 | b0 |
|----|----|----|----|----|----|----|----|----|
| B0 | MAJOR VERSION ||||  MINOR VERSION ||||
| B1 | [msb] |||||||  |
| B2 | MANUFACTURER CODE |||||||  [lsb] |
| B3 | EXT | [msb] ||||||  |
| ⋮  | BASIC DEVICE IDENTIFIER ||||||||
| B6 | |||||||  [lsb] |

WIRELESS POWER TRANSFER METHOD, APPARATUS AND SYSTEM FOR LOW AND MEDIUM POWER

CROSS-REFERENCE TO RELATED APPLICATION(S)

The present application is a Continuation of co-pending U.S. patent application Ser. No. 13/936,897 filed on Jul. 8, 2013, which claims priority to U.S. Provisional Application Nos. 61/669,504 filed on Jul. 9, 2012, 61/815,126 filed on Apr. 23, 2013, which claims priority under 35 U.S.C. § 119 to Korean Application No. 10-2013-0077368 filed in Korea on Jul. 2, 2013, whose entire disclosures are hereby incorporated by reference.

BACKGROUND

1. Field

This specification relates to a wireless power transfer method, apparatus and system in a wireless power transfer field.

2. Background

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

The Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 22, 2010. The standard document of the WPC has described a method of transferring power from one wireless power transmitter to one wireless power receiver by a magnetic induction.

The version 1.00 is involved with low power of 5 W power transmission and reception. A standard for power transfer over 5 W has not currently been defined in the wireless power transfers regulated in the WPC but a specification for medium power transmission and reception over 5 W is expected to be carried out.

SUMMARY OF THE DISCLOSURE

Therefore, an aspect of the detailed description is to provide a wireless power transfer method, a wireless power transfer apparatus and a wireless charging system for medium power, capable of being interoperable with a low power receiver.

Another aspect of the detailed description is to provide a standard for allowing interoperability between medium power and low power by transmitting and receiving signals in a form different form from the existing form, in a wireless power transfer method.

To achieve these and other advantages and in accordance with the purpose of this specification, as embodied and broadly described herein, there is provided a wireless power transfer method for a wireless power transfer apparatus using full and half-bridge inverter topologies, the method including detecting whether or not a wireless power receiver is present within a range of power being transferrable in a wireless manner, transmitting a detection signal to the wireless power receiver, receiving at least one of identification information and setting information from the wireless power receiver, receiving a control error packet from the wireless power receiver, and controlling an amount of power to be transferred by using the combination of a driving frequency, a duty cycle or a power signal phase to the full or half-bridge inverter.

In accordance with one exemplary embodiment, the inverter topology may be changed from the half-bridge into the full-bridge after receiving the first control error packet from a medium power wireless power receiver.

The amount of power to be transferred may be selected based on version information in an identification packet collected from the wireless power receiver when the first control error packet is received. The driving frequency may be shifted in response to the conversion from the half-bridge to the full-bridge.

In accordance with another exemplary embodiment, a power transfer unit of the wireless power transmitter may use a voltage corresponding to the half-bridge as an initial voltage.

The wireless power transmitter may drive the power transfer unit using one of the full-bridge inverter and the half-bridge inverter based on whether the wireless power receiver corresponds either to a medium power receiver or to a low power receiver, informed by the wireless power receiver.

In accordance with another exemplary embodiment, the wireless power transmitter may receive the identification packet from the wireless power receiver, and the identification packet may contain version information related to the wireless power receiver.

The wireless power transmitter may initially drive an LC circuit using the half-bridge inverter, and determine whether or not to change (or convert) the inverter topology from the half-bridge into the full-bridge based on the version information. The wireless power transmitter may change the inverter topology from the half-bridge into the full-bridge when the version information corresponds to medium power, and maintain the half-bridge inverter when the version information corresponds to low power.

In accordance with another exemplary embodiment, the driving frequency used at the step of detecting whether or not the wireless power receiver is present may be 140 kHz.

The detailed description also provides a method of receiving power in a wireless manner from a wireless power transmitter using full and half-bridge inverter topologies. The method may include transmitting a detection signal to the wireless power transmitter, transmitting at least one of identification information and setting information to the wireless power transmitter, and transmitting a control error packet to the wireless power transmitter, wherein the wireless power receiver transmits version information to the wireless power transmitter such that the wireless power transmitter controls an amount of power to be transferred by using the combination of a driving frequency, a duty cycle or a power signal phase to the full or half-bridge inverter.

The detailed description also provides a wireless power transmitter using full and half-bridge inverter topologies, the wireless power transmitter configured to detect whether or not a wireless power receiver is present within a range of power being transferrable in a wireless manner, transmit a detection signal to the wireless power receiver, receive at least one of identification information and setting information from the wireless power receiver, receive a control error packet from the wireless power receiver, and control an amount of power to be transferred by using the combination of a driving frequency, a duty cycle or a power signal phase to the full or half-bridge inverter.

The detailed description also provides a wireless charging system including a wireless power transmitter configured to transmit power in a wireless manner, and a wireless power receiver configured to receive the power from the wireless power transmitter in the wireless manner, wherein a power transfer unit of the wireless power transmitter includes an LC circuit configured to be switched between a full-bridge and a half-bridge, wherein the wireless power receiver informs the wireless power transmitter of whether or not the wireless power receiver itself corresponds to a medium power receiver or a low power receiver such that the wireless power transmitter decides whether to drive the power transfer unit using either the full-bridge or the half-bridge.

The present disclosure proposes an LC resonance driving method for interoperability between a wireless power transmitter and a wireless power receiver having different power capacities, which may extend an employment range of the wireless power transmitter and receiver. In more detail, the transmitter may detect whether the receiver is a low power receiver or a medium power receiver, and select an LC resonance driving mode. This may result in interoperability of different power receivers between wireless chargers.

Also, the present disclosure proposes a method for securing interoperability with a low power receiver in Chapter 3.2.2 Power Transmitter design MP-A2 of "Wireless Power Transfer Volume II: Medium Power Part 1: Interface Definition," which is undergoing in the WPC. In more detail, the present disclosure proposes a method of allowing a medium power (~15 W) transmission system to be interoperable with 5 W reception system by changing driving methods (modes) of bridge circuits after reception of a first control error (packet).

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The embodiments will be described in detail with reference to the following drawings in which like reference numerals refer to like elements wherein:

FIG. 22 is a configuration view of an identification packet of a receiver;

DETAILED DESCRIPTION

Figure 1:
FIG. 1 is an exemplary view conceptually illustrating a wireless power transmitter and a wireless power receiver according to the embodiments of the present invention.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication: communicating between one transmitter (Tx) and many receivers (Rx)

Unidirectional communication: transmitting a required message only from a receiver to a transmitter Here, the transmitter and the receiver indicate the same as a transmitting unit (device) and a receiving unit (device), respectively. Hereinafter, those terms may be used together.

Conceptual View of Wireless Power Transmitter and Wireless Power Receiver

FIG. 1 is an exemplary view conceptually illustrating a wireless power transmitter and a wireless power receiver according to the embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2A:
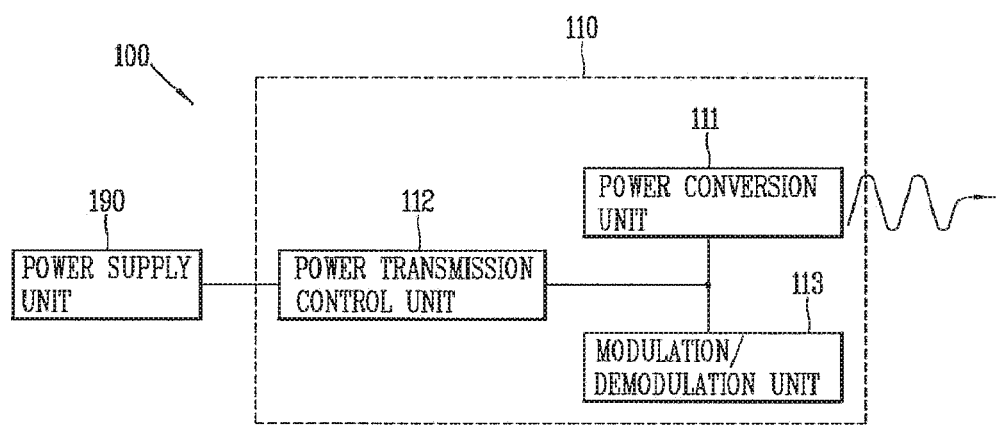
FIGS. 2A and 2B are exemplary block diagrams illustrating the configuration of a wireless power transmitter and a wireless power receiver that can be employed in the embodiments disclosed herein, respectively.
Figure 2B:
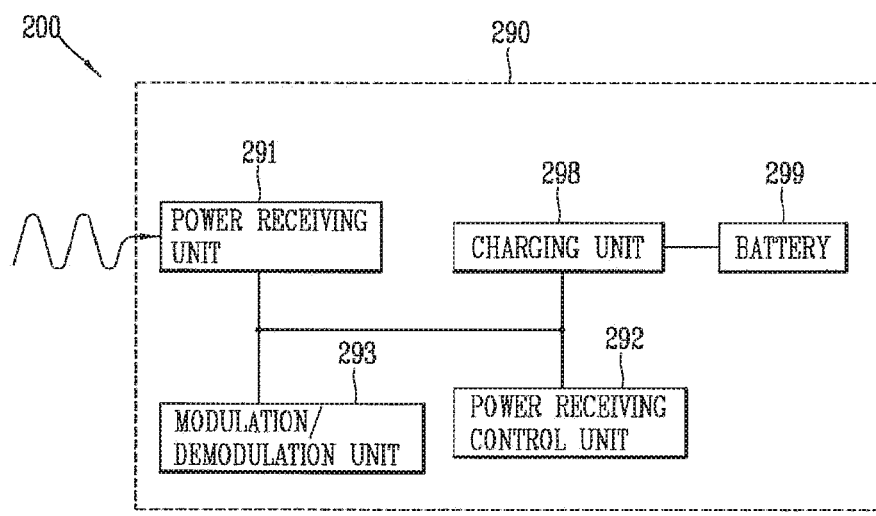

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electromagnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

[For Supporting In-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting In-Band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

Figure 3:
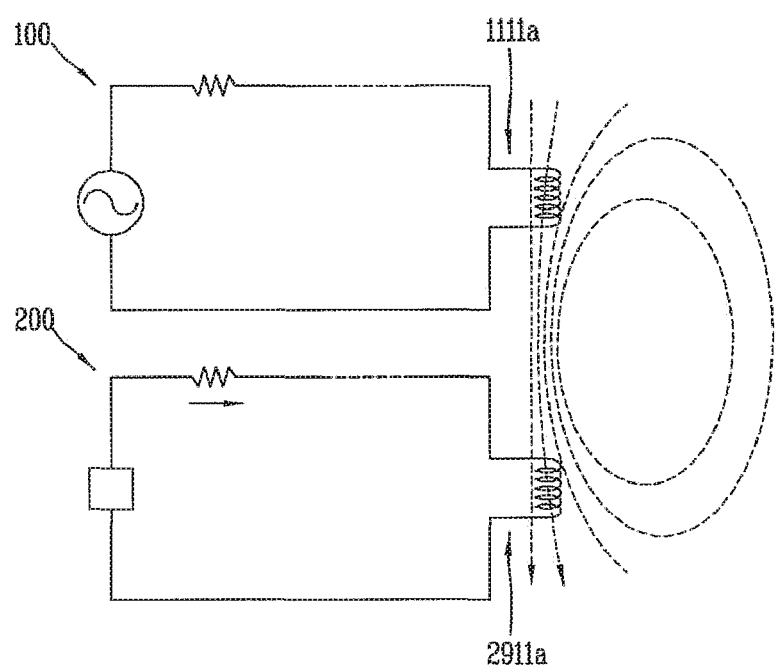
FIG. 3 is a view illustrating a concept in which power is transferred from a wireless power transmitter to a wireless power receiver in a wireless manner according to an inductive coupling method.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111*a* being operated as a primary coil in magnetic induction. Furthermore, the power receiving unit 291 of the wireless power receiver 200 may include a receiving (Rx) coil 2911*a* being operated as a secondary coil in magnetic induction.

First, the wireless power transmitter 100 and wireless power receiver 200 are disposed in such a manner that the transmitting coil 1111*a* at the side of the wireless power transmitter 100 and the receiving coil at the side of the wireless power receiver 200 are located adjacent to each other. Then, if the power transmission control unit 112 controls a current of the transmitting coil (Tx coil) 1111*a* to be changed, then the power receiving unit 291 controls power to be supplied to the wireless power receiver 200 using an electromotive force induced to the receiving coil (Rx coil) 2911*a*.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111*a* may be mounted at a lower portion of the interface surface. In this case, a vertical spacing is formed in a small-scale between the transmitting coil 1111*a* mounted at a lower portion of the interface surface and the receiving coil 2911*a* of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111*a* mounted at a lower portion of the interface surface and the receiving coil 2911*a* can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911*a* of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

Figure 4A:
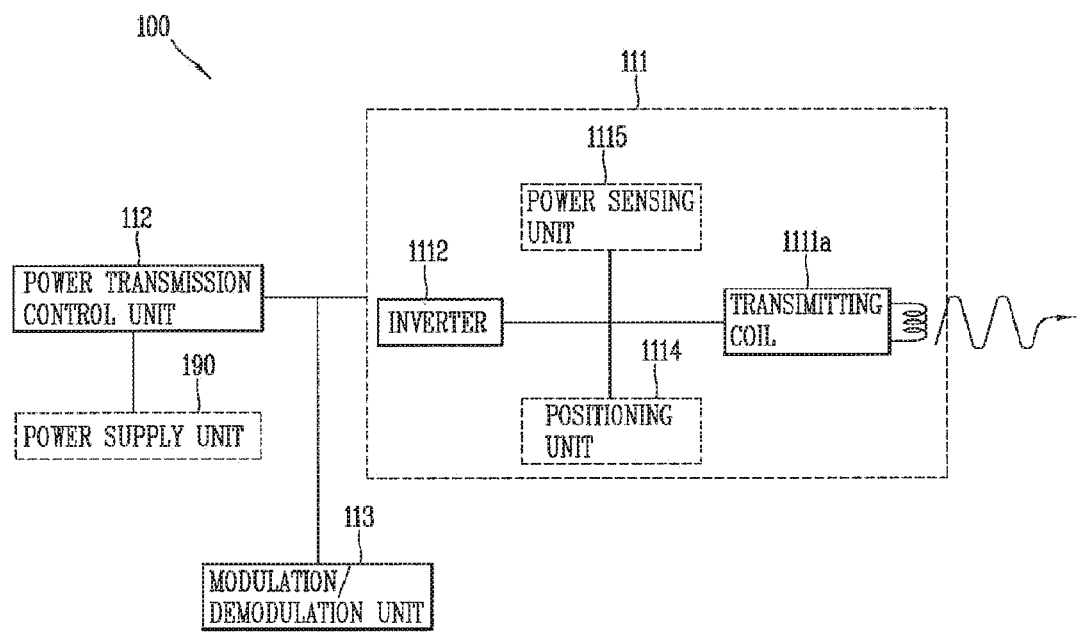
FIGS. 4A and 4B are a block diagram illustrating part of the wireless power transmitter and wireless power receiver in a magnetic induction method that can be employed in the embodiments disclosed herein.
Figure 4B:
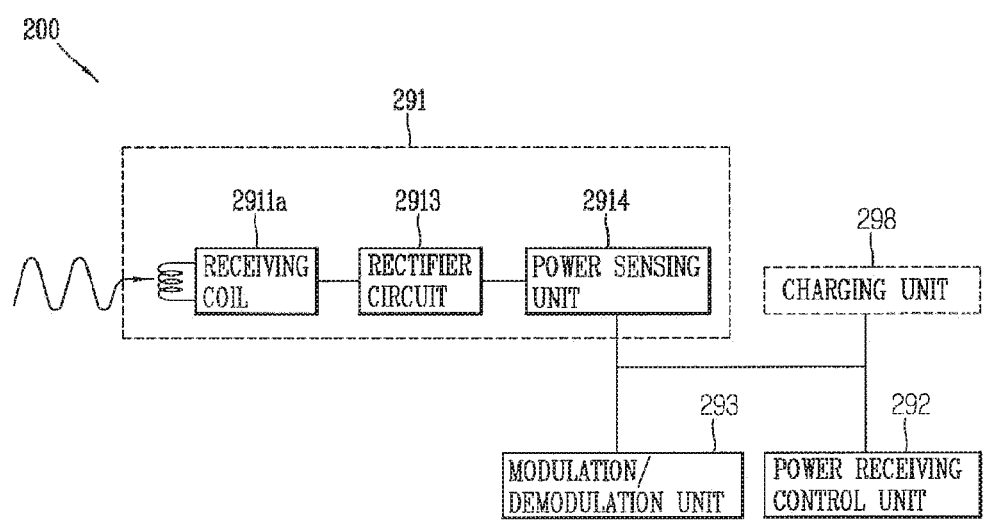

FIGS. 4A and 4B are a block diagram illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111*a* and an inverter 1112.

The transmitting coil 1111*a* may form a magnetic field corresponding to the wireless power signal according to a change of current as described above. The transmitting coil 1111*a* may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111*a* and a capacitor (not shown) to form a magnetic field in the transmitting coil 1111*a*.

In addition, the power conversion unit 111 may further include a positioning unit 1114.

The positioning unit 1114 may move or rotate the transmitting coil 1111*a* to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111*a* such that a center-to-center distance of the transmitting coil 1111*a* of the wireless power transmitter 100 and the receiving coil 2911*a* of the wireless power receiver 200 is within a predetermined range, or rotating the transmitting coil 1111*a* such that the centers of the transmitting coil 1111*a* and the receiving coil 2911*a* are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

Figure 5:
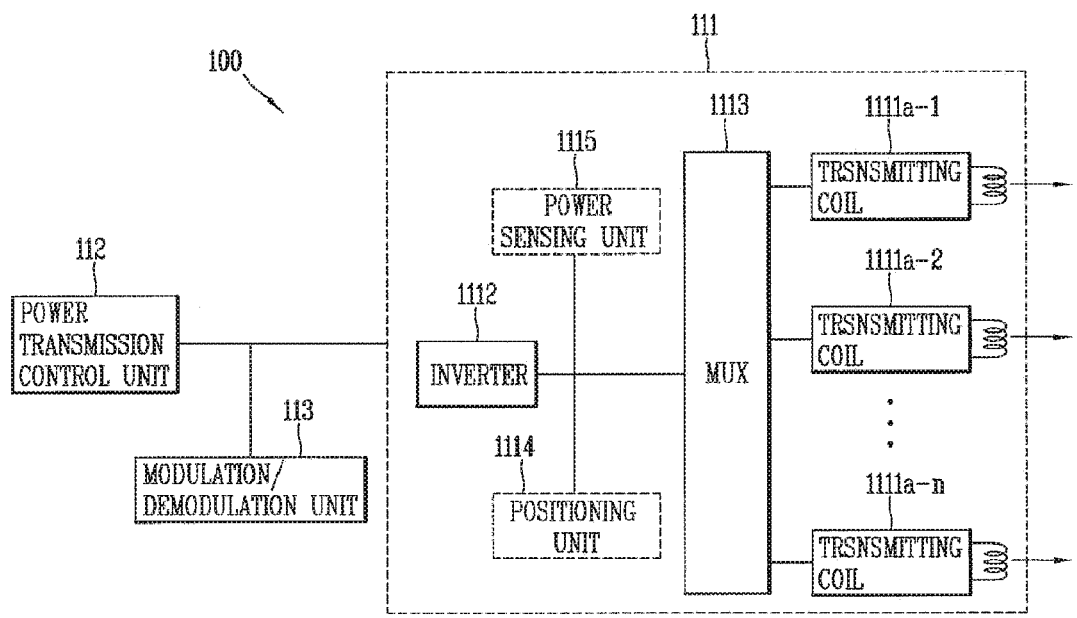
FIG. 5 is a block diagram illustrating a wireless power transmitter configured to have one or more transmitting coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
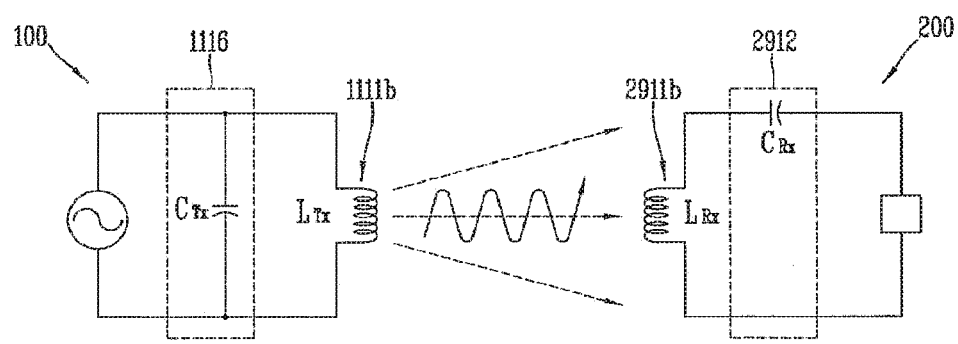
FIG. 6 is a view illustrating a concept in which power is transferred to a wireless power receiver from a wireless power transmitter in a wireless manner according to a resonance coupling method.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the wireless power receiver 200 generates resonance when a result of substituting the $L_{RX}$ and $C_{Rx}$ of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

Figure 7A:
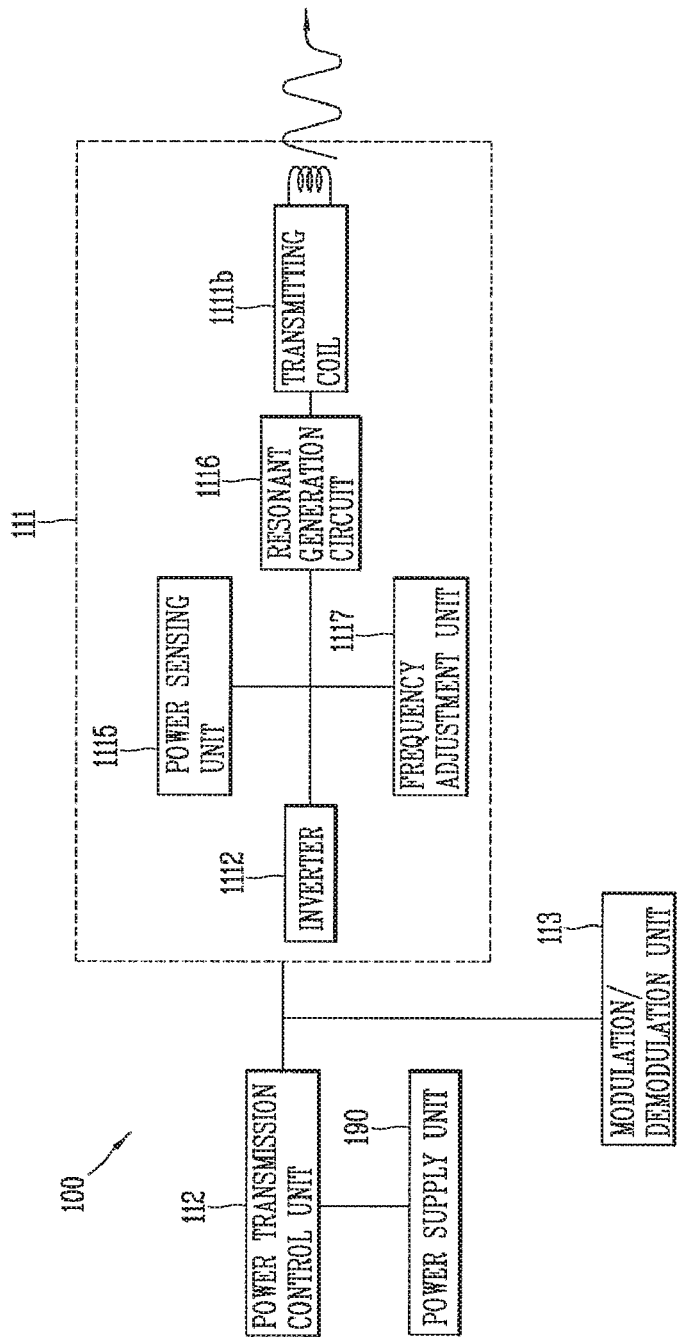
FIGS. 7A and 7B are a block diagram illustrating part of the wireless power transmitter and wireless power receiver in a resonance method that can be employed in the embodiments disclosed herein.
Figure 7B:
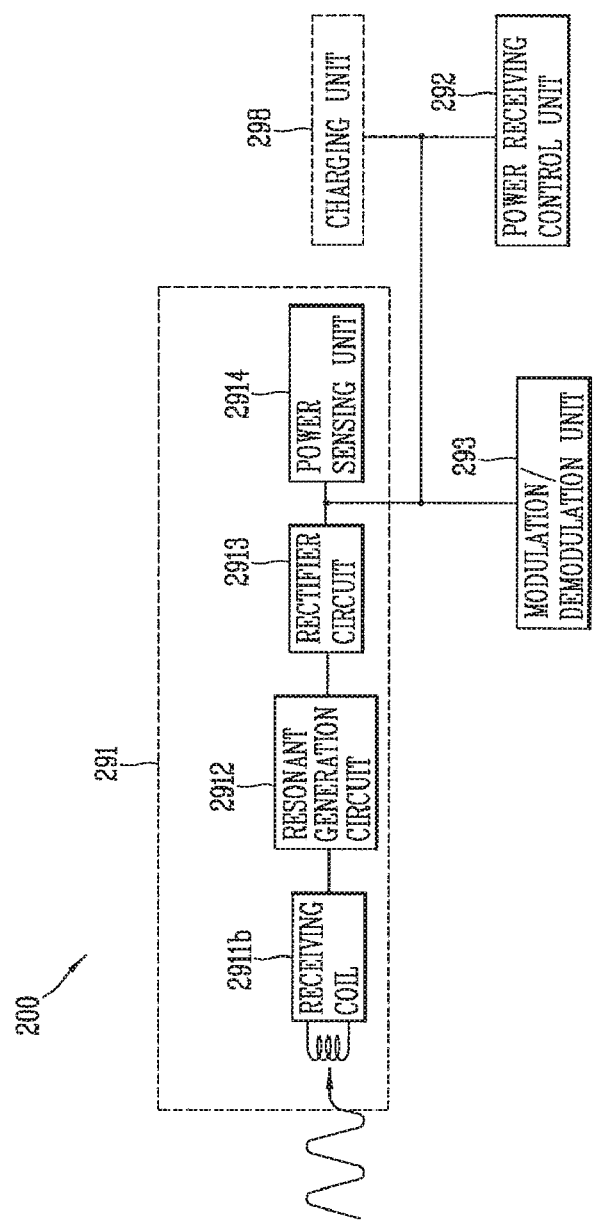

FIGS. 7A and 7B are a block diagram illustrating part of the wireless power transmitter 100 and wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

Figure 8:
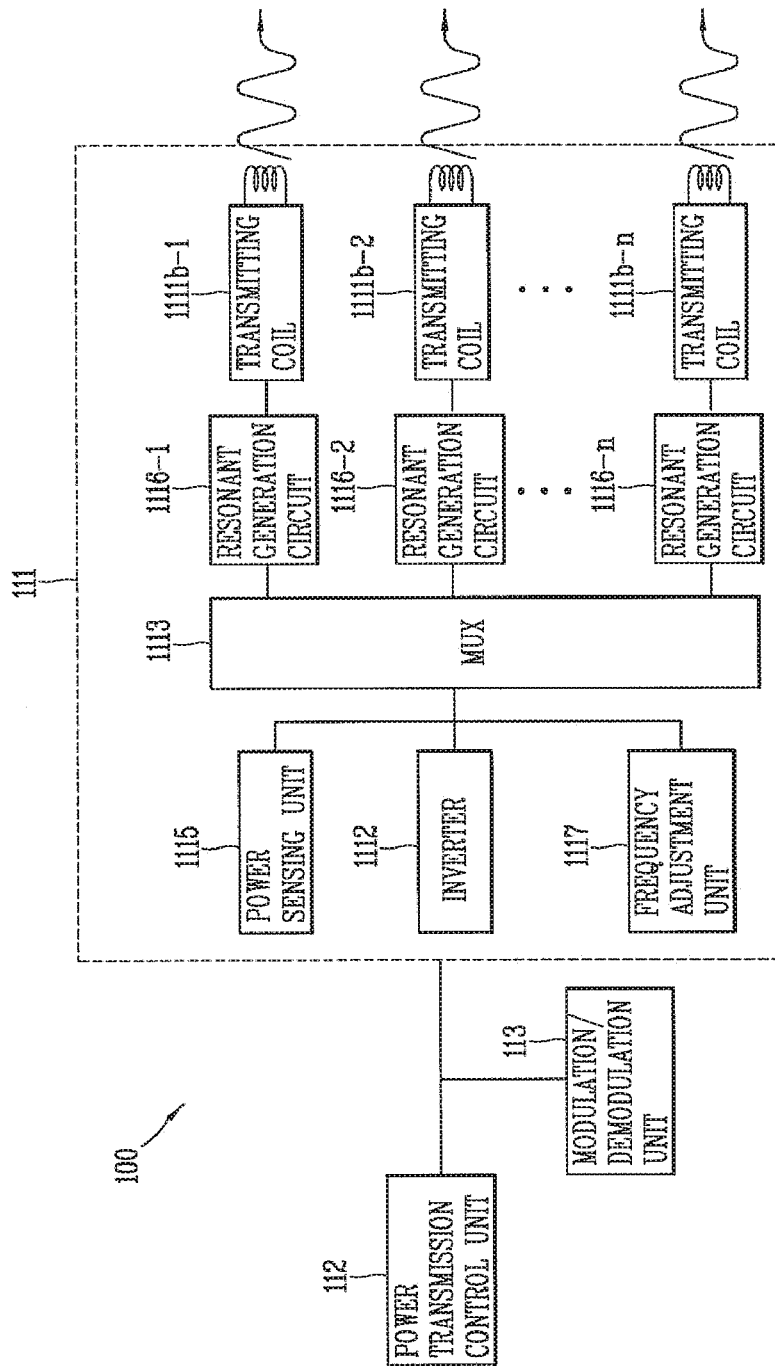
FIG. 8 is a block diagram illustrating a wireless power transmitter configured to have one or more transmitting coils receiving power according to a resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-Band Communication

Figure 9:
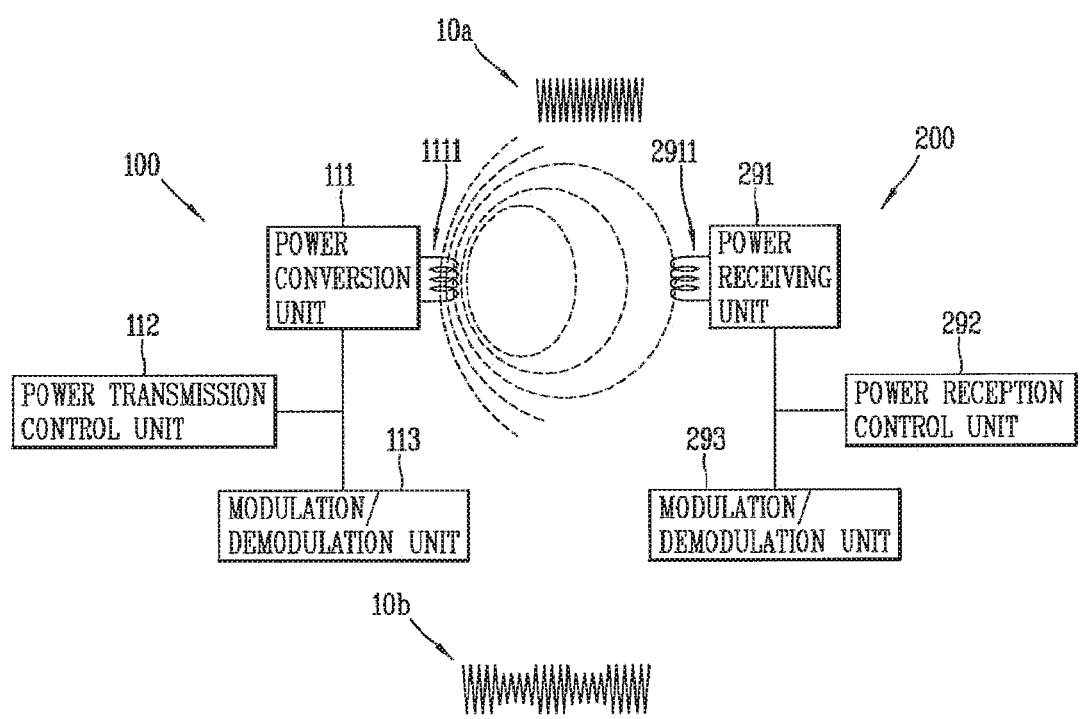
FIG. 9 a view illustrating a concept of transmitting and receiving a packet between a wireless power transmitter and an electronic device through the modulation and demodulation of a wireless power signal in transferring power in a wireless manner disclosed herein.

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electromagnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10 and 11.

Figure 10:
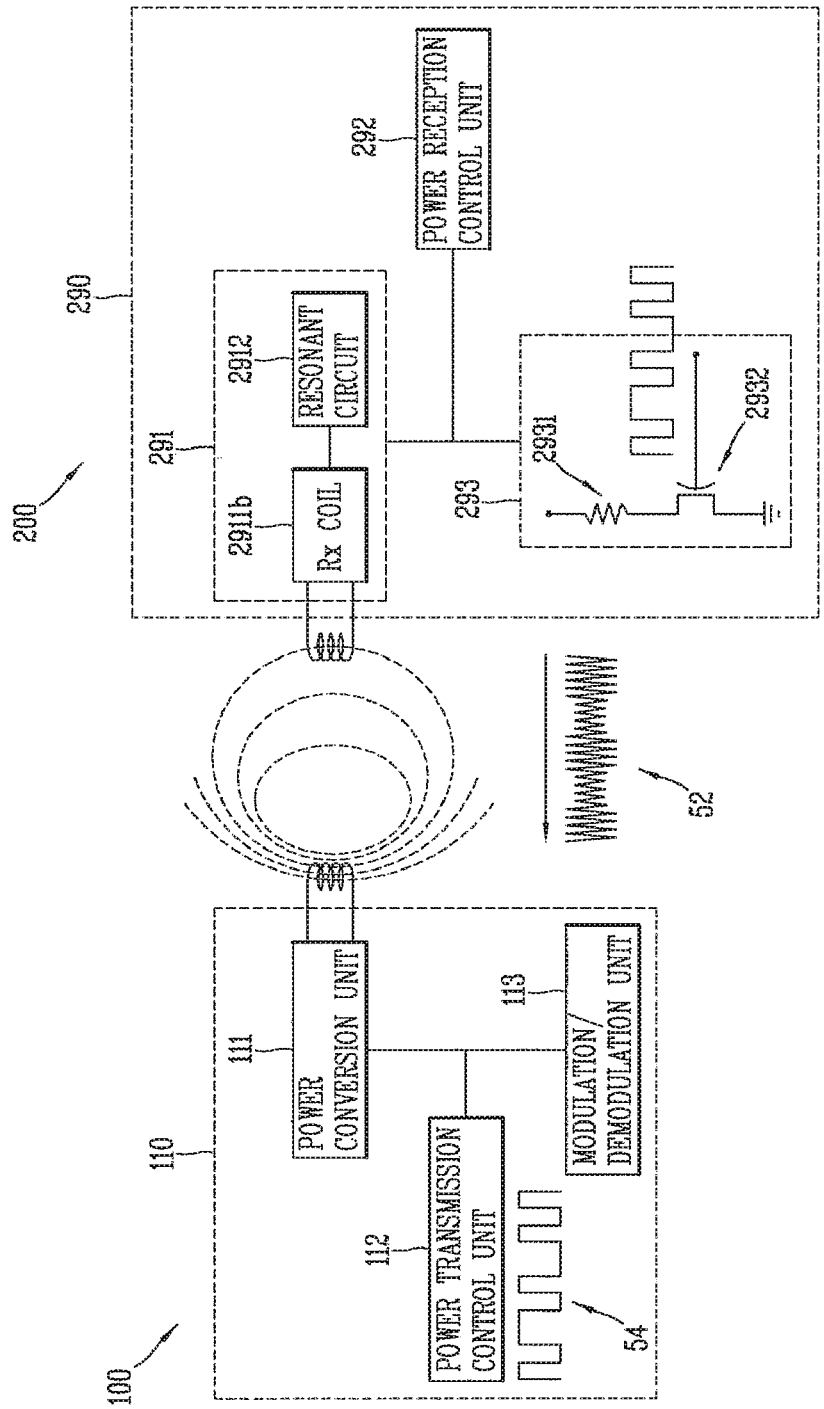
FIG. 10 is a view illustrating a configuration of transmitting and receiving a power control message in transferring power in a wireless manner disclosed herein'
Figure 11:
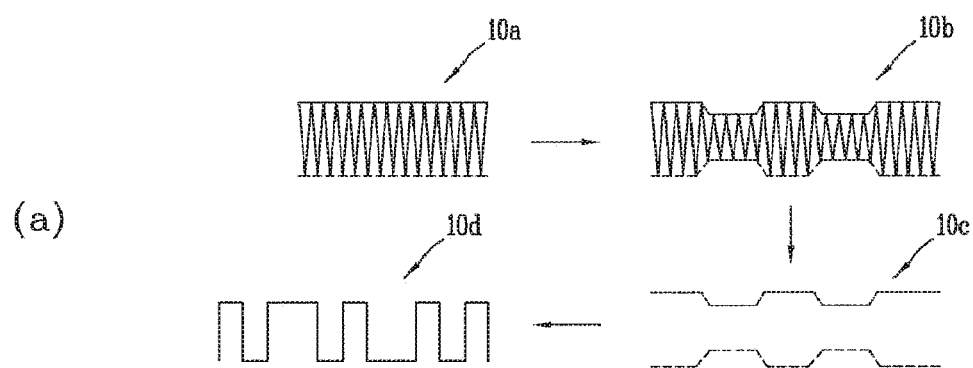
FIG. 11 is a view illustrating forms of signals upon modulation and demodulation executed in a wireless power transfer disclosed herein.
Figure 11:
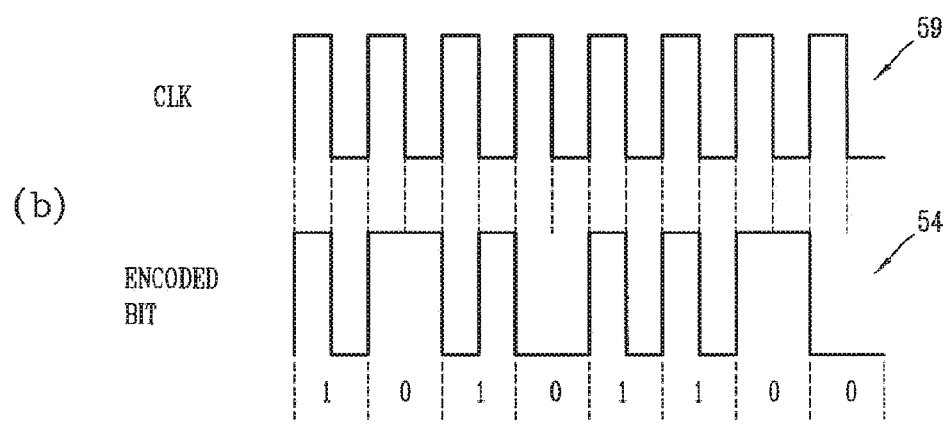
Figure 11:
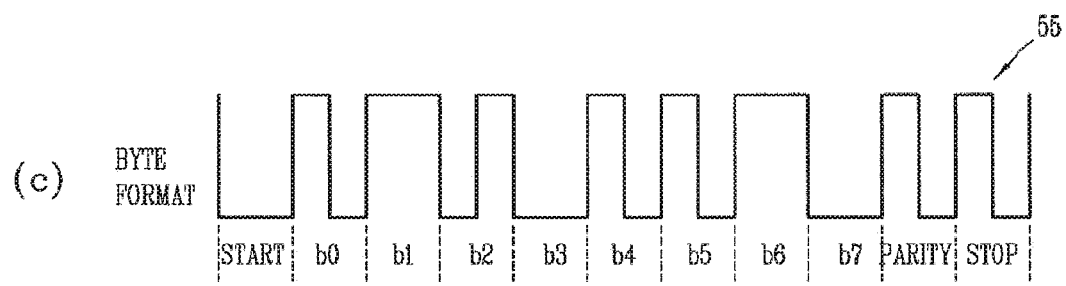

FIG. 10 is a view illustrating a configuration of transmitting or receiving a power control message in transferring power in a wireless manner disclosed herein, and FIG. 11 is a view illustrating forms of signals upon modulation and demodulation executed in the wireless power transfer disclosed herein.

Referring to FIG. 10, the wireless power signal received through the power receiving unit 291 of the wireless power receiver 200, as illustrated in (a) of FIG. 11, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelope detection, and decode the detected signal 53 into digital data 54. The demodulation may detect a current or voltage flowing into the power conversion unit 111 to be classified into two states, a HI phase and a LO phase, and acquire a packet to be transmitted by the wireless power receiver 200 based on digital data classified according to the states.

Hereinafter, a process of allowing the wireless power transmitter 100 to acquire a power control message to be transmitted by the wireless power receiver 200 from the demodulated digital data will be described.

Referring to (b) of FIG. 11, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in (c) of FIG. 12. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting In-Band Two-Way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

Figure 12:
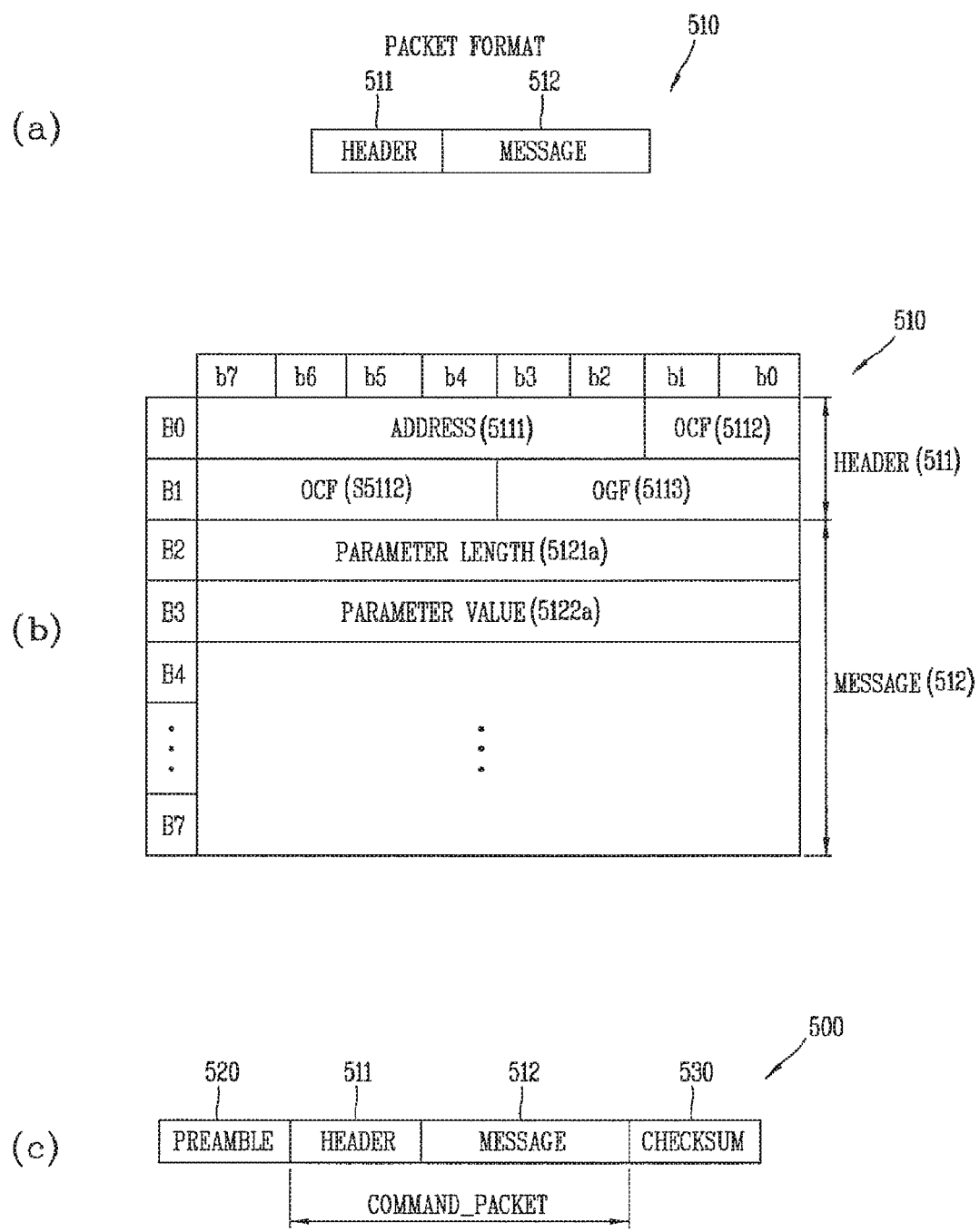
FIG. 12 is a view illustrating a packet including a power control message used in a contactless (wireless) power transfer method according to the embodiments disclosed herein.

FIG. 12 is a view illustrating a packet including a power control message used in a contactless (wireless) power transfer method according to the embodiments disclosed herein.

As illustrated in (a) of FIG. 12, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in (b) of FIG. 12. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to (c) of FIG. 12, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

Figure 13:
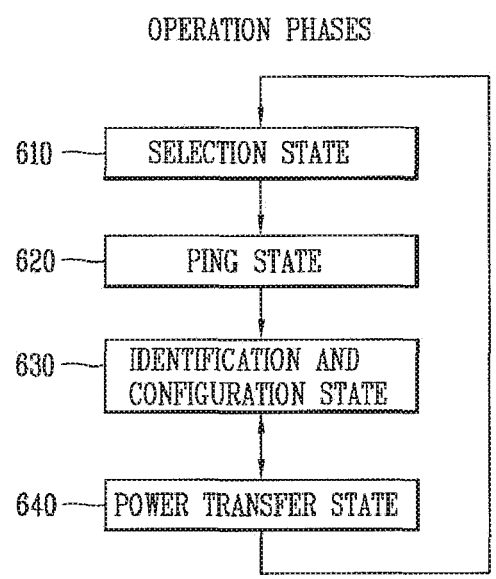
FIG. 13 is a view illustrating operation phases of the wireless power transmitter and wireless power receiver according to the embodiments disclosed herein.
Figure 14:
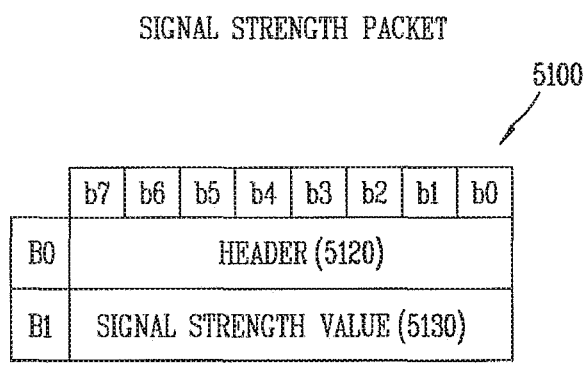
FIGS. 14, 15A-15B, and 16-18 are views illustrating the structure of packets including a power control message between the wireless power transmitter 100 and the wireless power receiver.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection state 610, and the wireless power transmitter 100 sends a detection signal to the detected object and the wireless power receiver 200 sends a response to the detection signal in the ping state 620.

Furthermore, the wireless power transmitter 100 identifies the wireless power receiver 200 selected through the previous states and acquires configuration information for power transmission in the identification and configuration state 630. The wireless power transmitter 100 transmits power to the wireless power receiver 200 while controlling power transmitted in response to a control message received from the wireless power receiver 200 in the power transfer state 640.

Hereinafter, each of the operation phases will be described in detail.

1) Selection State

The wireless power transmitter 100 in the selection state 610 performs a detection process to select the wireless power receiver 200 existing within a detection area. The detection area, as described above, refers to a region in which an object within the relevant area can effect on the characteristic of the power of the power conversion unit 111. Compared to the ping state 620, the detection process for selecting the wireless power receiver 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection state 610 may be referred to as an analog ping process in the aspect of detecting an object using a wireless power signal without using a packet in a digital format in the ping state 620 which will be described later.

The wireless power transmitter 100 in the selection state 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state 610 may be different from one another.

First, in case where power is transmitted according to the inductive coupling method, the wireless power transmitter 100 in the selection state 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the detection area.

On the other hand, the wireless power transmitter 100 in the selection state 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the wireless power receiver 200 existing within the detection area through a power control message. Compared to the detection process of the wireless power receiver 200 using a characteristic of the wireless power signal and the like in the selection state 610, the detection process in the ping state 620 may be referred to as a digital ping process.

The wireless power transmitter 100 in the ping state 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration state 630. In other words, the wireless power transmitter 100 maintains the power signal at a specific operating point subsequent to finding the wireless power receiver 200 to receive a power control message required in the identification and configuration state 630.

However, if the wireless power transmitter 100 is not able to find the wireless power receiver 200 to which power can be transferred, then the operation phase of the wireless power transmitter 100 will be returned to the selection state 610.

3) Identification and Configuration State

The wireless power transmitter 100 in the identification and configuration state 630 may receive identification information and/or configuration information transmitted by the wireless power receiver 200, thereby controlling power transmission to be effectively carried out.

Figure 15A:
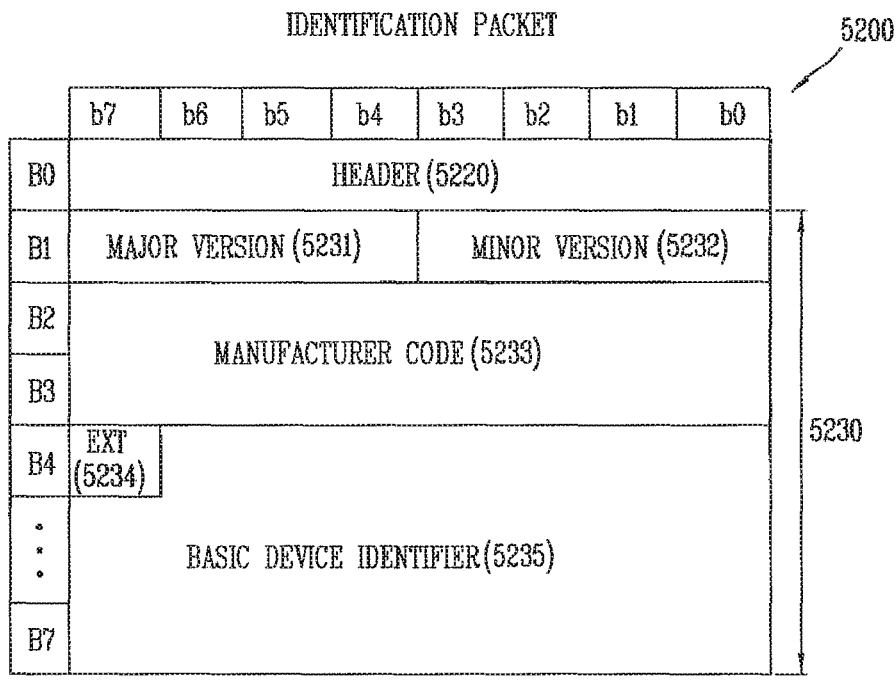
Figure 15B:
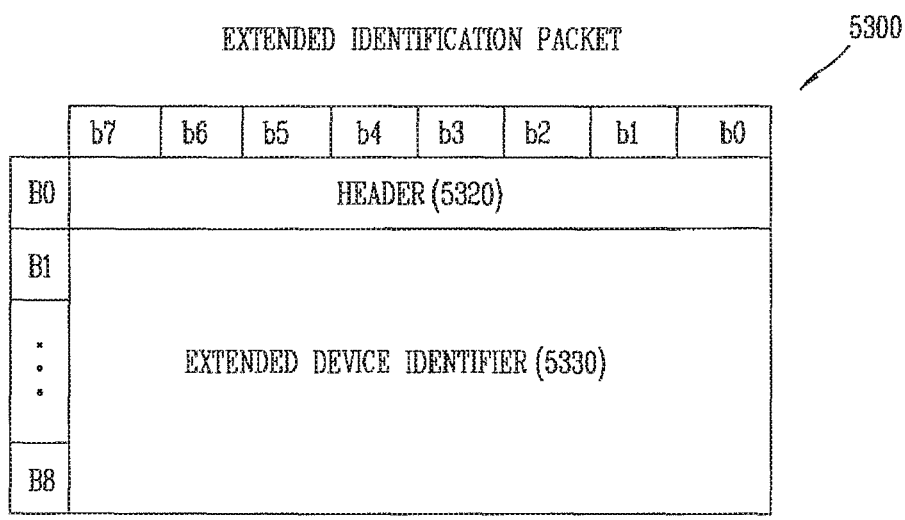

The wireless power receiver 200 in the identification and configuration state 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

Figure 16:
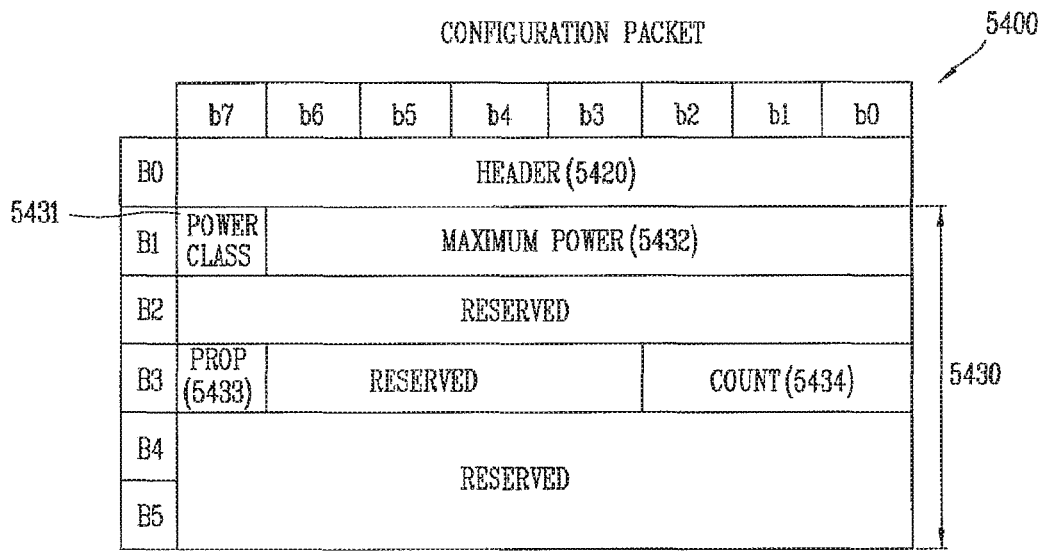

The wireless power receiver 200 may transmit a power control message including information on expected maximum power in the identification and configuration state 630. To this end, the wireless power receiver 200, for instance, may transmit a configuration packet 5400 as illustrated in FIG. 16. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer state 640.

The wireless power transmitter 100 may terminate the identification and configuration state 630 and return to the selection state 610 prior to entering the power transfer state 640. For instance, the wireless power transmitter 100 may terminate the identification and configuration state 630 to find another electronic device that can receive power in a wireless manner.

4) Power Transfer State

The wireless power transmitter 100 in the power transfer state 640 transmits power to the wireless power receiver 200.

Figure 17:
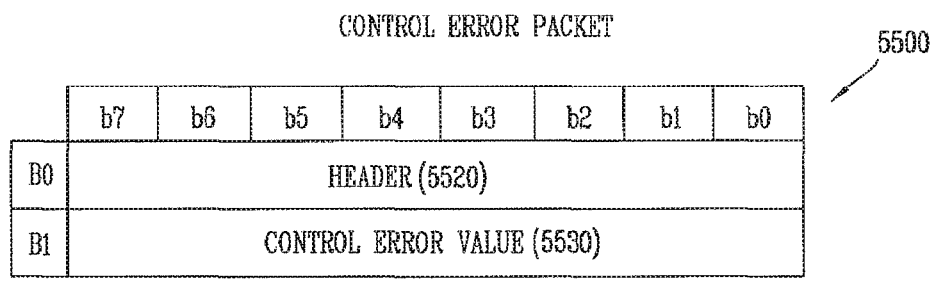

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 17. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer state 640. As a result of monitoring the parameters, if power transmission to the wireless power receiver 200 violates the limits included in the power transfer contract, then the wireless power transmitter 100 may cancel the power transmission and return to the selection state 610.

The wireless power transmitter 100 may terminate the power transfer state 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection state 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration state 630.

Figure 18:
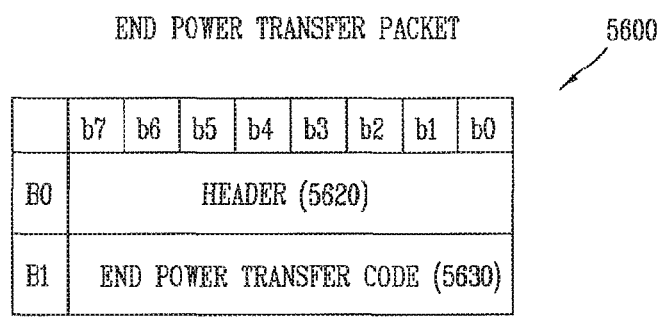

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

Figure 19:
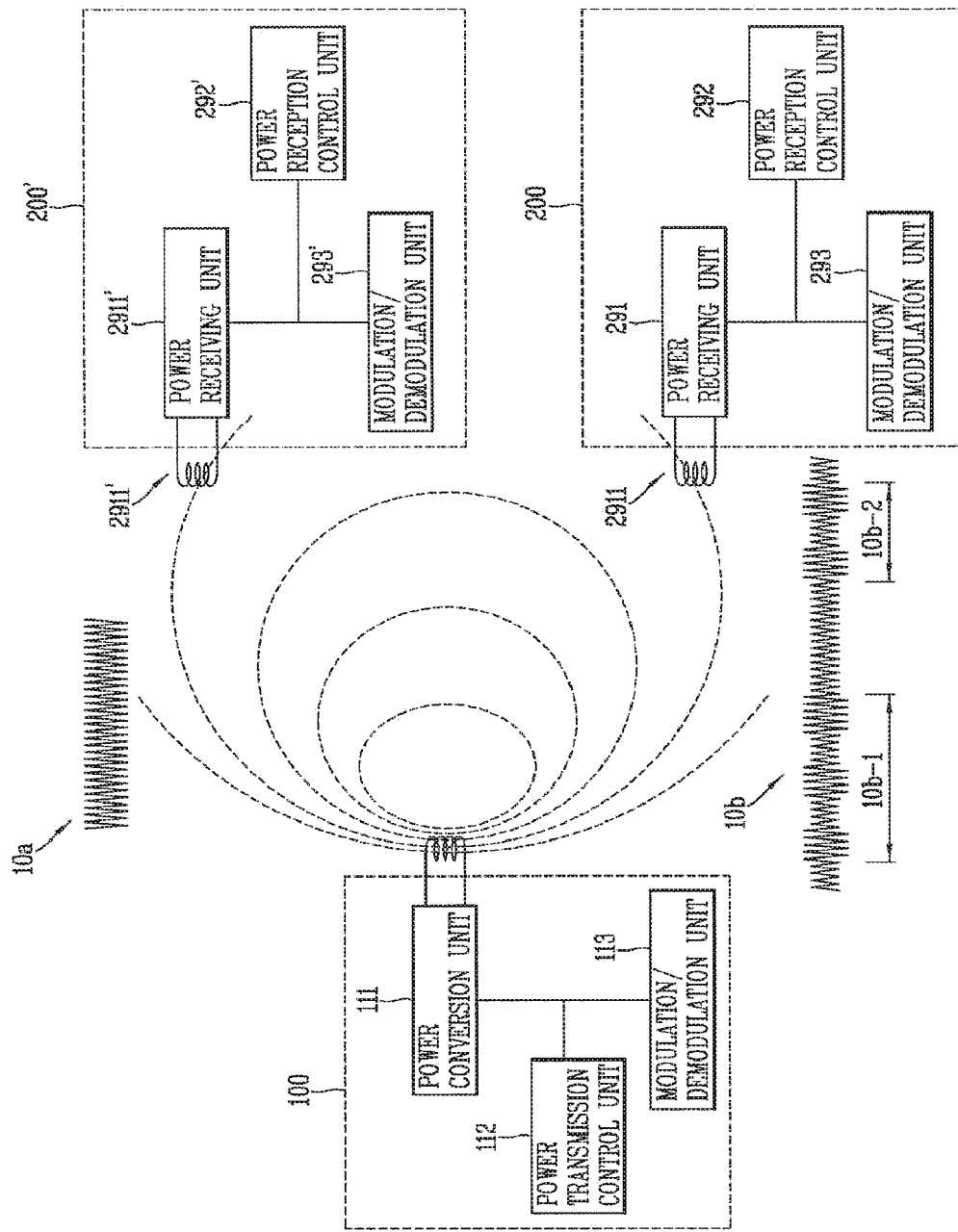
FIG. 19 is a conceptual view illustrating a method of transferring power to at least one wireless power receiver from a wireless power transmitter.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10a generated by the wireless power transmitter 100 may arrive at the first electronic device 200' and the second electronic device 200, respectively. The first and second electronic devices 200' and 200 may transmit wireless power messages using the generated wireless power signal 10a.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

The present disclosure proposes a communication protocol selection method in a wireless charging system (or a wireless power transmitter/receiver) using multiple communication protocols, a structure of a transmitter allowing for interoperability of an induction method and a resonance method in the wireless charging system, and a communication method of the transmitter allowing for the interoperability of the induction method and the resonance method. Hereinafter, detailed description thereof will be given.

Also, the present disclosure proposes a method for securing interoperability with a low power receiver in Chapter 3.2.2 Power Transmitter design MP-A2 of "Wireless Power Transfer Volume II: Medium Power Part 1: Interface Definition," which is undergoing in the WPC. In more detail, the present disclosure proposes a method of allowing a medium power (~15 W) transmission system to be interoperable with 5 W reception system by changing driving methods (modes) of bridge circuits after reception of a first control error (packet). Hereinafter, detailed description thereof will be given.

Method of Changing Mode of Wireless Power Transmitter According to Power Information of Wireless Power Receiver Hereinafter, a technology of extending a medium power (~15 W) system to a low power (5 W) system for use by adding a new phase between the identification & configuration phase and the power transfer phase in Chapter 5 System Control in Wireless Power Specification Part 1 System Description of WPC will be described with reference to FIGS. 20 to 32.

First of all, description will be given of a communication protocol selection method in a wireless power transmitter/receiver using medium power with reference to FIGS. 20 to 23.

Figure 20:
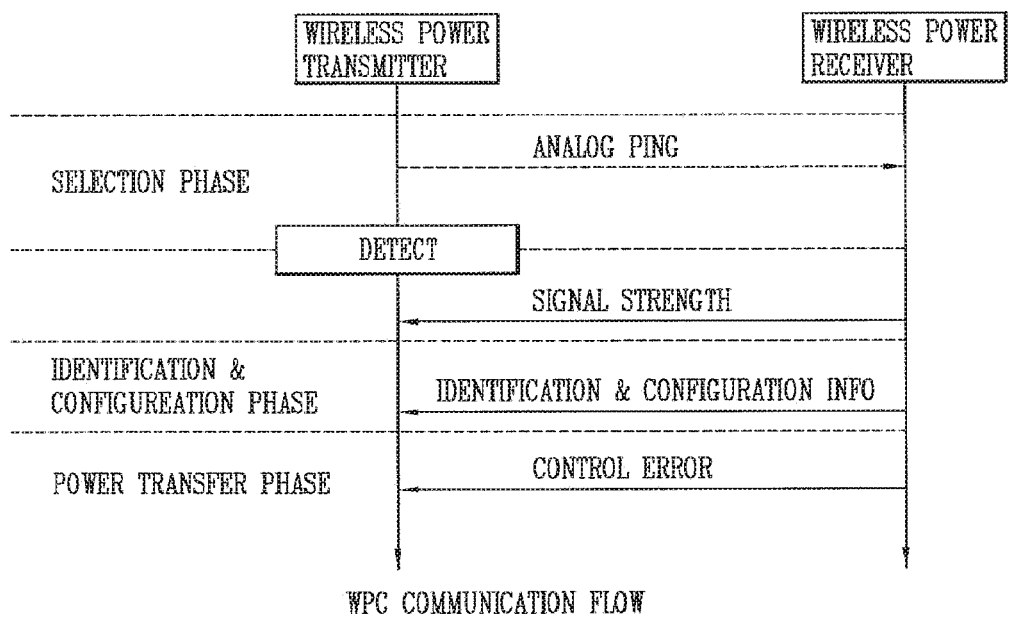
FIG. 20 is a conceptual view illustrating a WPC communication flowchart.
Figure 21:
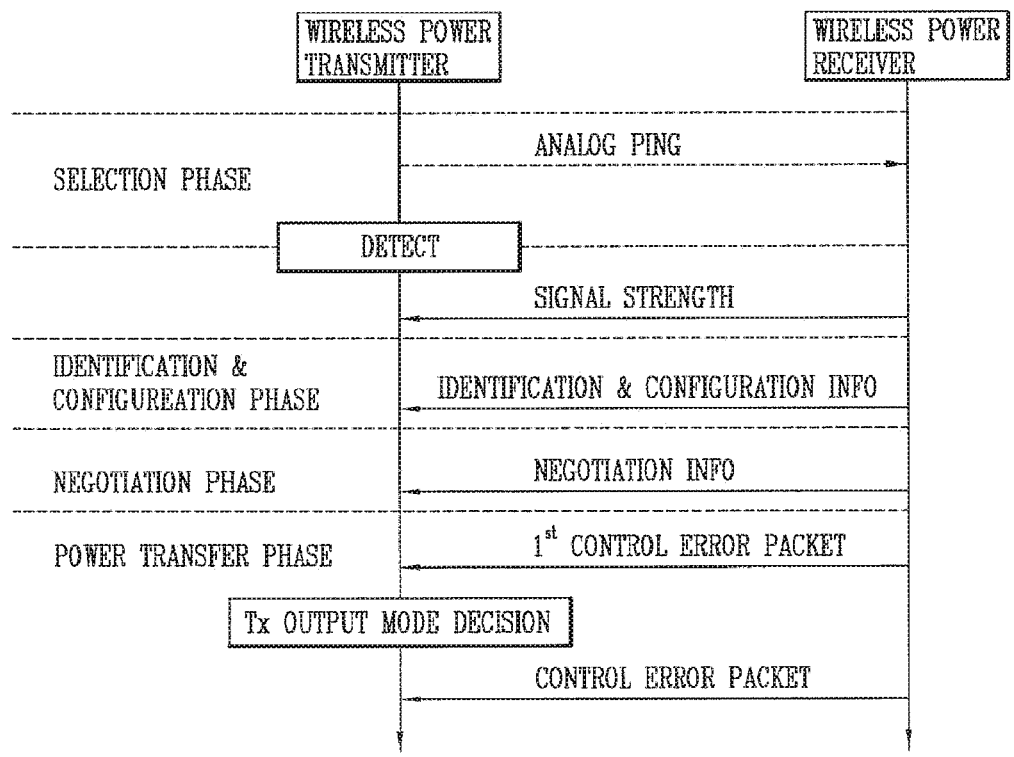
FIG. 21 is a view illustrating a communication flowchart in the method in accordance with the one exemplary embodiment.
Figure 23:
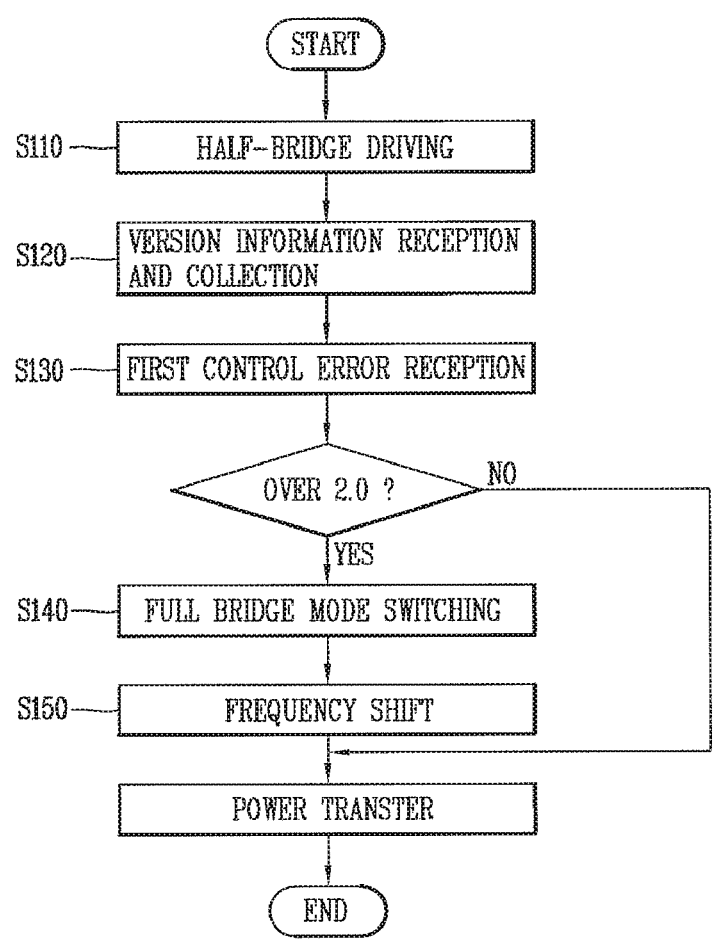
FIG. 23 is a flowchart illustrating a communication flowchart proposed herein.

FIG. 20 is a conceptual view illustrating WPC communication flows, FIG. 21 is a view illustrating communication flows in a method in accordance with one exemplary embodiment, FIG. 22 is a configuration view of an identification packet of a receiver, and FIG. 23 is a flowchart illustrating communication flows proposed herein.

Hardware of a medium power wireless power transmitter may have a full-bridge configuration to transmit higher power than the existing transmitter. Here, when transferring power to the existing 5 W receiver in the full-bridge mode (or using the full-bridge configuration or the full-bridge inverter), voltage and current may be greatly abandoned. This may cause a breakdown of the receiver.

Therefore, a method for allowing a medium power wireless power transmitter to stably transfer power even to the 5 W receiver is required.

It is natural that a medium power transmitter TX stably transfers power to a medium power receiver RX. Interoperability between the medium power transmitter TX and the existing low power reception system may additionally be required. To this end, the present disclosure may allow a TX to carry out an LC driving mode (half-bridge and full-bridge) conversion to be stable and appropriate for each of a low power reception system and a medium power reception system, based on version information collected from an RX.

As illustrated, at the moment of receiving a first control error after recognition of a receiver, a process of determining version information related to an identification packet collected from the RX to change an LC driving mode may be added to the existing WPC communication flows.

As a more detailed example, a wireless power transmitter according to the present disclosure may use full-bridge and half-bridge inverter topologies. That is, the wireless power transmitter may include a power transfer unit for switching the full-bridge and half-bridge inverters (or switching the full-bridge and half-bridge modes).

A wireless power transfer method according to the present disclosure may include detecting whether or not a wireless power receiver is present within a range that power can be transferred in a wireless manner, and transmitting a detection signal to the wireless power receiver. These processes can be understood by the foregoing description, so detailed description thereof will be omitted.

Next, the method may further include receiving at least one of identification information and setting information transmitted by the wireless power receiver (S120), and receiving a control error packet from the wireless power receiver (S130). As a pre-step of such information collection, half-bridge mode driving may be carried out (S110). Here, the method may further include changing an LC driving mode by determining version information in an identification packet collected from the wireless power receiver, at the time point of receiving the first control error after recognition of the receiver in the existing WPC communication flows. Here, the present disclosure may not be limited to this. For example, a low power receiver or a medium power receiver may also be determined by collecting maximum power information other than the version information.

Eventually, in the wireless power transfer method, the wireless power transmitter may use the combination of an operating frequency, a duty cycle or a phase of the power signal to either the full or half-bridge inverter in order to control the amount of power to be transferred. That is, the wireless power transmitter may drive the power transfer unit in one of the full-bridge driving mode and the half-bridge driving mode based on whether the wireless power receiver is a medium power receiver or a low power receiver, informed by the corresponding wireless power receiver (S140).

For example, in the negotiation phase having medium power, after receiving the first control error from the medium power receiver, an inverter topology may be changed from the half-bridge (inverter) into the full-bridge (inverter).

In this case, a problem may be caused in stability of the receiver according to whether to switch an initial LC driving mode from the half-bridge mode into the full-bridge mode or from the full-bridge mode into the half-bridge mode. This is why a rectifier voltage of the receiver is likely to suddenly change by two times or half (½) times due to the conversion of the LC driving mode used upon recognition of the power receiver and frequency shifting.

To solve the problem, the inverter topology may be changed from the half bridge into the full bridge after receiving a first control error packet from a medium power wireless power receiver. The amount of power to be transferred may be selected based on the version information in the identification packet collected from the wireless power receiver when receiving the first control error packet. In more detail, in this exemplary embodiment, the wireless power transmitter may initially drive its LC circuit in the half bridge mode at a frequency with a high gain, and check that the receiver is a medium power receiver. The wireless power transmitter may then shift the frequency to a frequency with a low gain upon conversion into the full bridge after receiving the first control error packet, thereby preventing a voltage from being excessively applied to a secondary side (the receiver side).

As one example, the transmitter may initially drive the LC circuit in the half-bridge mode at a frequency at high power is transferred to the receiver. When the receiver is recognized, the transmitter may collect version information related to the receiver. Here, the receiver may transmit its own version information to the transmitter through an identification packet (see FIG. 22). The transmitter may then receive the version information of the receiver in the identification phase.

The power transfer unit of the wireless power transmitter may use a voltage corresponding to the half-bridge as an initial voltage. Therefore, the initial voltage of the half-bridge may be 12V. Also, an initial frequency may be set in the range of 135 to 145 kHz (duty cycle of 50%). In more detail, in order to pass a test of the existing low power receiver, the frequency may be set to 140 kHz upon recognition of the receiver (execution of a digital ping).

Next, when the version information of the receiver is over 2.0, the LC driving mode may be switched from the half-bridge into the full-bridge, and if not, maintained in the half-bridge driving mode. That is, when the version information of the receiver is checked to be over 2.0, the transmitter may switch its LC circuit to the full-bridge mode to transfer power. When the half-bridge is switched to the full-bridge, an operating frequency (or driving frequency, hereinafter "driving frequency") may be shifted (S150).

As such, the wireless power transmitter may start driving the LC circuit in the half-bridge mode, and decide whether or not to switch the LC circuit to the full-bridge based on the version information.

Upon the conversion from the half-bridge to the full-bridge, the TX may set a start frequency within a range that does not damage a rectifier circuit of the RX. As one example, when only the driving mode is switched with maintaining the same frequency, a gain value may increase by two times. Hence, when the RX requires the gain value less than two times, the start frequency of the TX may be set to be over 140 kHz. That is, the driving frequency in the full-bridge mode may be over 140 kHz.

Figure 24:
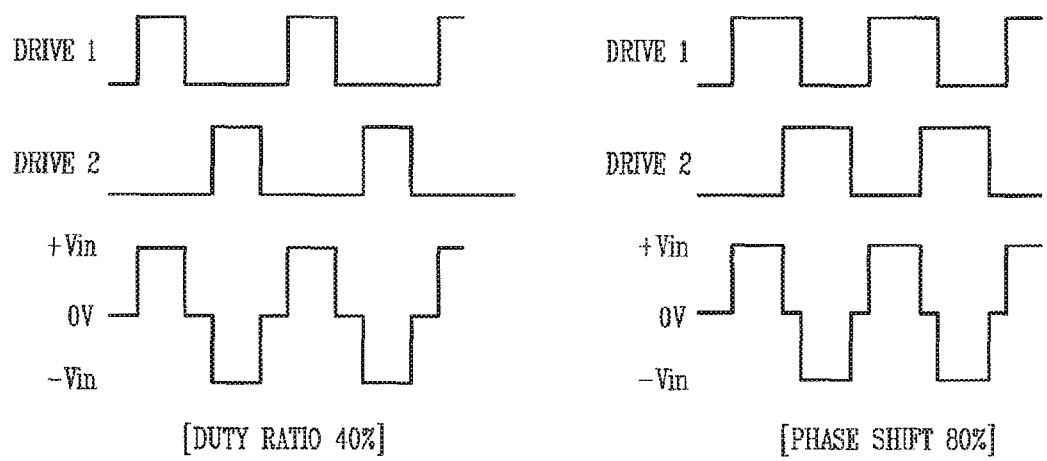
FIGS. 24 and 25 are conceptual views illustrating an exemplary use of medium power.
Figure 25:
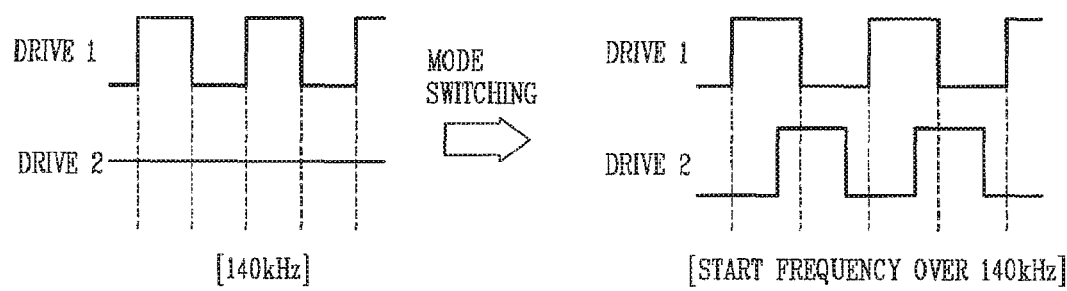
Figure 26:
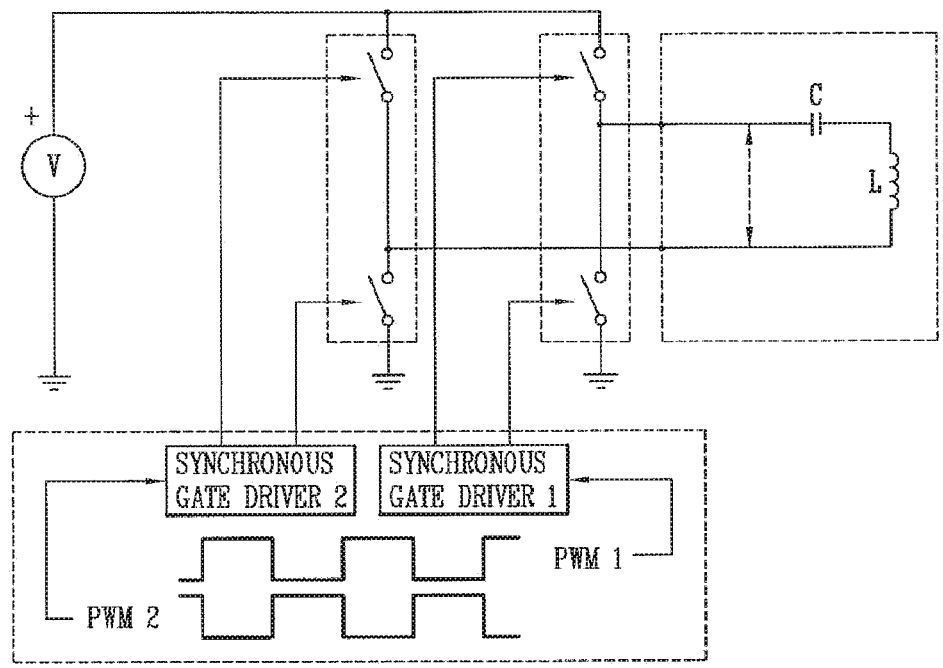
FIGS. 26 and 27 are configuration views of circuits using a full-bridge and a half-bridge, respectively.
Figure 27:
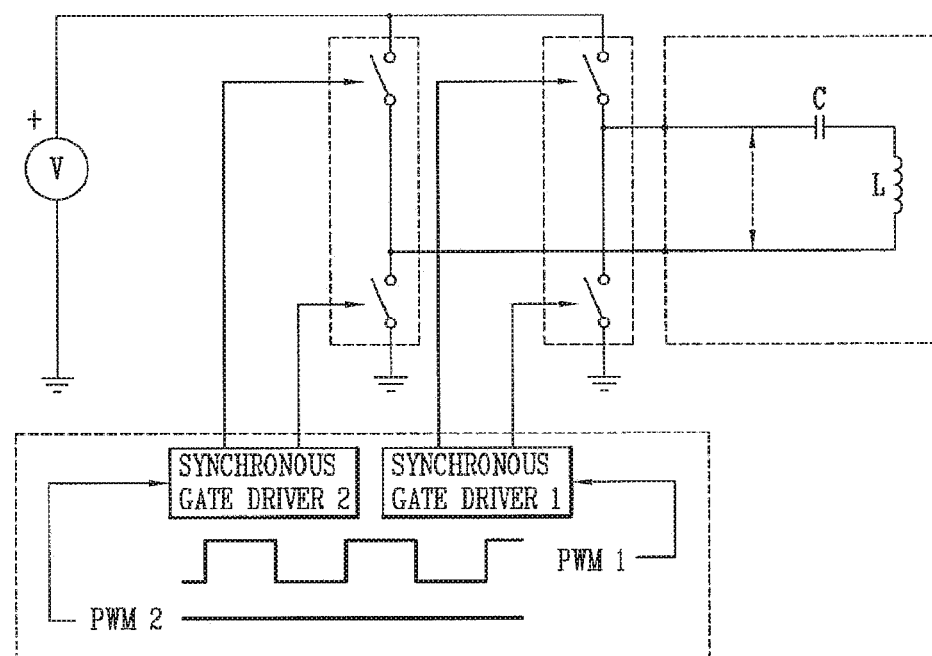

FIGS. 24 and 25 are conceptual views illustrating an exemplary use of medium power, and FIGS. 26 and 27 are configuration views of circuits using a full-bridge and a half-bridge, respectively.

Control of the power transfer shall proceed using the PID algorithm. As illustrated in FIG. 24, it may be understood that output power corresponds to the full-bridge when the duty cycle is 40% and the phase shift is 80%, respectively. Therefore, as illustrated in FIG. 25, the half-bridge mode in which a voltage is applied only to Drive 1 may be shifted to the full-bridge mode by shifting phase with applying the voltage to each of Drive 1 and Drive 2.

As more detailed numerical values, a driving frequency range may be $f_{op}$=110~205 kHz, and a phase shift range of the full-bridge may be 80 to 100%. Also, the driving frequency range may be 50 to 100% at $f_{op}$=205 kHz.

A duty cycle rage of the half-bridge may be 40 to 50% when $f_{op}$=110~205 kHz, and be 25 to 50% at $f_{op}$=205 kHz.

A higher driving frequency or a lower phase or duty cycle may result in the transfer of a lower amount of power. In order to transfer the sufficient amount of power, the driving frequency may be controlled with the following resolution.

0.07×fop-0.5 kHz for $f_{op}$ in the 110 to 140 kHz range;
0.006×fop-0.4 kHz for $f_{op}$ in the 140 to 205 kHz range.

For hardware configuration, referring to FIG. 26, in the full-bridge mode, a PWM2 pulse of a micom output terminal may be generated in the form of a reversal signal of PWM1 or a phase-shifted form to drive the LC circuit. In the half-bridge mode, referring to FIG. 27, the PWM2 pulse of the micom output terminal may be shifted to a ground signal to drive the LC circuit, and accordingly, a half-bridge output may be represented as shown in the first drawing of FIG. 25. Such hardware configuration may be varied into various forms.

Figure 28:
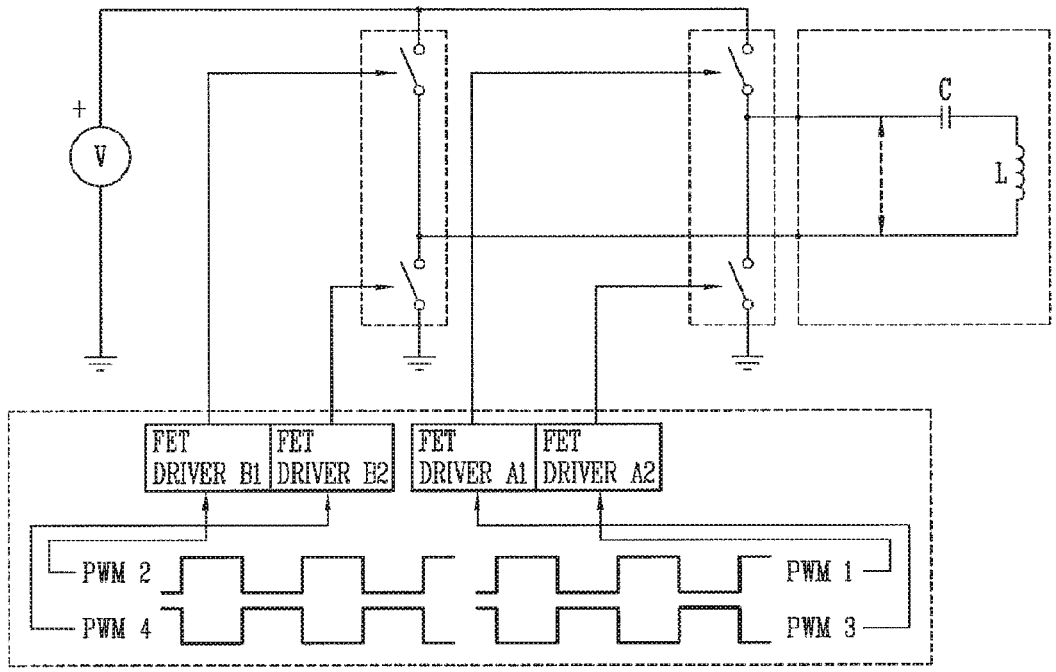
FIGS. 28 and 29 are configuration views illustrating variations of the circuits using the full-bridge and the half-bridge, respectively.
Figure 29:
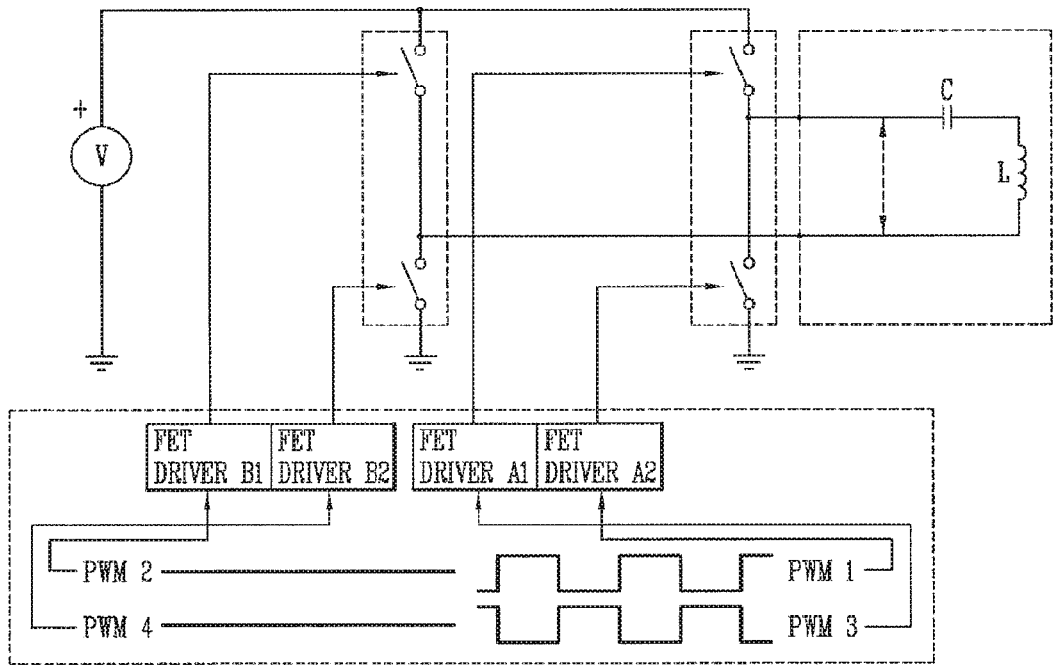

FIGS. 28 and 29 are configuration views illustrating variations of the circuits using the full-bridge and the half-bridge, respectively.

Unlike the foregoing exemplary embodiment using a synchronous gate driver, in this exemplary embodiment, drivers may be connected to switches, respectively, and an LC circuit in the full-bridge mode may be driven by generating PWM3 and 4 pulses of a micom output terminal into the form of reversal signals of PWM1 and 2 or the phase-shifted form. Also, the LC circuit in the half-bridge mode may be driven by implementing the PWM3 pulse of the micom output terminal in the form of a reversal signal of the PWM1, the PWM2 pulse into a GND, and PWM4 into a high signal.

Also, the present disclosure may disclose another exemplary embodiment for the conversion of the initial driving. Hereinafter, the another exemplary embodiment will be described in more detail with reference to FIGS. 30 to 32.

Figure 30:
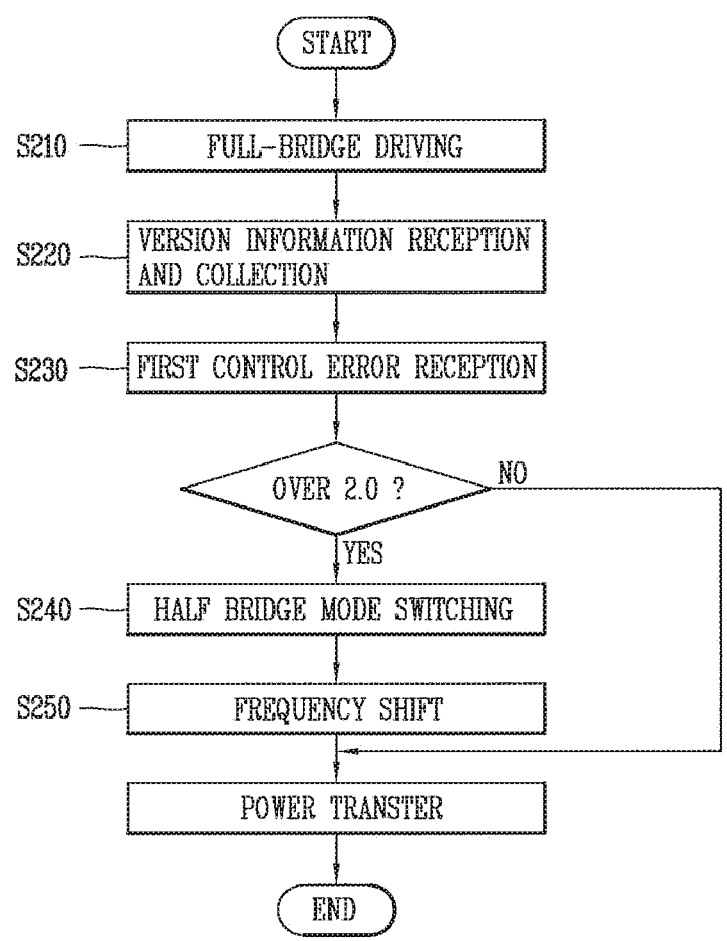
FIG. 30 is a flowchart illustrating a communication flowchart according to another exemplary embodiment.
Figure 31:
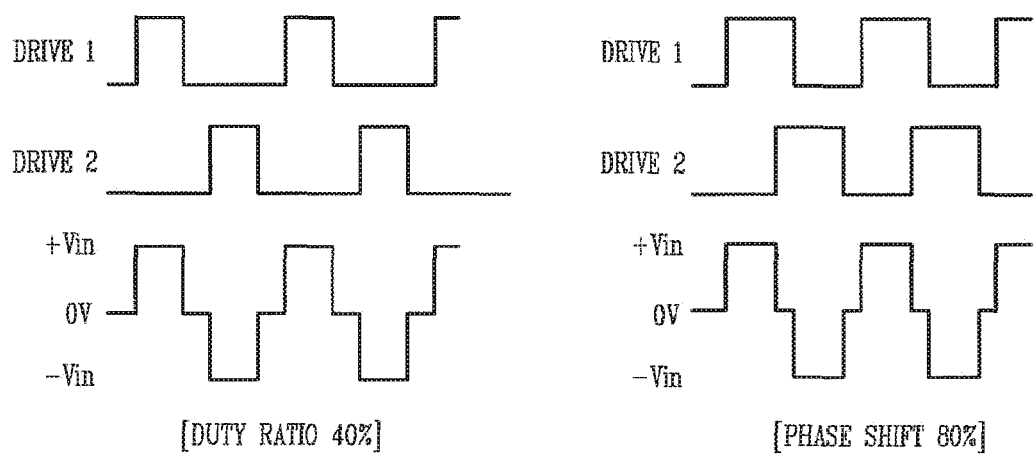
FIGS. 31 and 32 are conceptual views illustrating an exemplary use of medium power in accordance with another exemplary embodiment.
Figure 32:
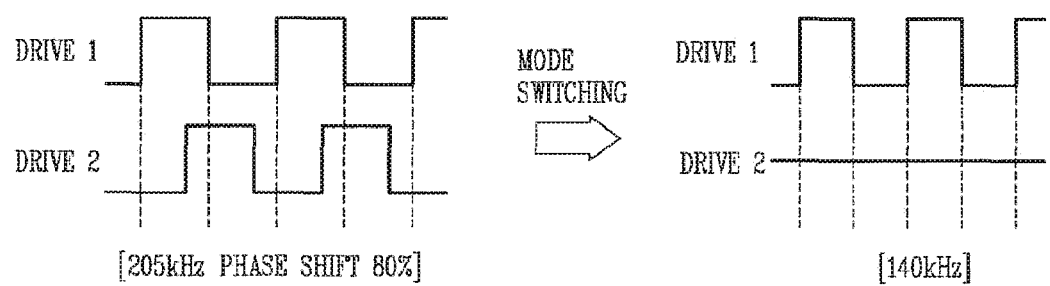

FIG. 30 is a flowchart illustrating communication flows according to another exemplary embodiment, and FIGS. 31 and 32 are conceptual views illustrating an exemplary use of medium power in accordance with another exemplary embodiment.

As illustrated in FIGS. 30 to 32, the transmitter may initially drive its LC circuit in a full-bridge mode at a frequency with a low gain until reception of the first control error according to the existing WPC communication flows, and check that the receiver is a low power receiver by receiving and collecting version information (S220), and receive the first control error (S230). Afterwards, the transmitter may shift the frequency to a frequency with a low gain upon conversion into the half-bridge mode, thereby preventing a voltage from being excessively applied to a secondary side (the low power receiver).

In more detail, when a low frequency over 205 kHz is required upon recognition of the receiver (executing a digital ping) in order to pass a test for the existing low power interoperable receiver, a phase shift for a full-bridge driving signal may be executed or a duty ratio may be adjusted. For example, an initial driving frequency of the full-bridge may be 205 kHz, and duty cycle may be 40%.

Here, when version information of the receiver is below 2.0, the LC driving mode may be switched from the full-bridge into the half-bridge (S240), and if not, the full-bridge mode may be maintained. Upon the switching from the full-bridge into the half-bridge, a problem of a decrease in the amount of power transferred to the receiver may be caused. To compensate for this, the driving frequency may be shifted (S250). As one example, for Tx coil MP-A2, the LC circuit may be driven at an operating frequency of 140 kHz and a duty cycle of 40%. Then, when the version is below 2.0, the frequency of the half-bridge may be shifted to 140 kHz.

Accordingly, Power Transmitter design MP-A2 uses half and full-bridge inverter topologies to drive the Primary Coil and a series capacitance. Within the operating frequency range specified above, the assembly of primary coil and shielding, has a self inductance $L_p$=7.8 µH. The value of the series capacitance is $C_p$=328 nF. The input voltage to the inverter is 12 V. Near resonance, the voltage developed across the series capacitance can reach levels exceeding 200 V pk-pk.

As such, the receiver may transmit its own version information to the transmitter through an identification packet, and the transmitter may maintain the existing LC driving mode until receiving the first control error. The transmitter may then determine whether or not the receiver is a low power receiver or a medium power receiver based on the version information of the receiver. According to the determination result, the transmitter may change the LC driving mode and shift the frequency. This may result in removal of risk that a high voltage is applied to the receiver.

It can be understood by a skilled person in the art that the configuration of the wireless power transmitter according to the foregoing embodiments disclosed herein can also be applied to other devices, such as a docking station, a cradle device and other electronic devices, excluding a case of being applicable only to a wireless charger.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transmitter having full and half-bridge inverter topologies for transferring wireless power to a low or medium power wireless receiver, the wireless power transmitter configured to:
   apply a power signal by controlling a driving frequency to the half-bridge inverter to control an amount of power to be transferred;
   receive a control error packet from a wireless power receiver;
   change the inverter topology from the half-bridge into the full-bridge after receiving the control error packet when the wireless power receiver is identified as the medium power wireless receiver; and
   apply a power signal to the full bridge inverter to control an amount of power to be transferred.

2. The wireless power transmitter of claim 1, wherein the power transmitter is further configured to receive at least one of an identification packet or configuration information from the wireless power receiver;
   wherein the configuration information includes information on a maximum amount of power and the wireless power receiver is identified as the medium power wireless receiver based on the maximum amount of power.

3. The wireless power transmitter of claim 1, wherein the driving frequency is shifted in response to the conversion from the half-bridge to the full-bridge.

4. The wireless power transmitter of claim 1, wherein a power transfer unit of the wireless power transmitter uses a voltage corresponding to the half-bridge as an initial voltage.

5. The wireless power transmitter of claim 1, wherein the wireless power transmitter is further configured to drive the power transfer unit using one of the full-bridge inverter and the half-bridge inverter based on whether the wireless power receiver corresponds either to the medium power receiver or to the low power receiver, informed by the wireless power receiver.

6. The wireless power transmitter of claim 1, wherein the wireless power transmitter receives an identification packet from the wireless power receiver, the identification packet comprising version information related to the wireless power receiver.

7. The wireless power transmitter of claim 1, wherein the wireless power transmitter is further configured to initially drive an LC circuit using the half-bridge inverter, and determines whether or not to change the inverter topology from the half-bridge into the full-bridge after receiving the control error packet.

8. The wireless power transmitter of claim 1, wherein the wireless power transmitter is further configured to change the inverter topology from the half-bridge into the full-bridge after receiving the control error packet when the wireless power receiver is the medium power receiver and maintains the half-bridge when the wireless power receiver is the low power receiver.

9. The wireless power transmitter of claim 1, wherein the driving frequency of the full-bridge inverter is initially in the range of 135 kHz to 145 kHz.

10. The wireless power transmitter of claim 1, wherein the driving frequency used at the step of detecting whether or not the wireless power receiver is present is 140 kHz.

11. A wireless power receiver that receives power in a wireless manner from a wireless power transmitter having full and half-bridge inverter topologies, the wireless power receiver corresponding to a low or medium power wireless receiver and configured to:
   receive a power signal controlled by a driving frequency from the half-bridge inverter to control an amount of power to be transferred;
   transmit a control error packet from the wireless power receiver to the wireless power transmitter; and
   receive a power signal controlled by at least one of the driving frequency or a duty cycle from the full-bridge inverter to control an amount of power to be transferred,
   wherein the inverter topology is changed from the half-bridge into the full-bridge after the control error packet is transmitted when the wireless power receiver is identified as the medium power wireless receiver.

12. The wireless power receiver of claim 11, further configured to transmit at least one of an identification packet or configuration information to the wireless power transmitter,
   wherein the configuration information includes information on the maximum amount of power and the wireless power receiver is identified as the medium power wireless receiver based on the maximum amount of power.

13. A wireless charging system comprising:
   a wireless power transmitter configured to transmit power in a wireless manner; and
   a wireless power receiver corresponding to a low or medium power wireless receiver and configured to receive the power from the wireless power transmitter in the wireless manner,
   wherein a power transfer unit of the wireless power transmitter comprises an LC circuit configured to be switched between a full-bridge and a half-bridge,
   wherein the wireless power receiver further configured to:
   transmit a control error packet from the wireless power receiver to the wireless power transmitter; and
   receive a power signal controlled by at least one of the driving frequency or a duty cycle from the full-bridge inverter to control an amount of power to be transferred,
   wherein the inverter topology is changed from the half-bridge into the full-bridge after the control error packet is transmitted when the wireless power receiver is identified as the medium power wireless receiver.

14. The wireless charging system of claim 13, wherein the wireless power transmitter and the wireless power receiver are configured to:
   detect by the wireless power transmitter whether or not the wireless power receiver is present;
   transmit by the wireless power transmitter a detection signal to the wireless power receiver;
   receive by the wireless power transmitter at least one of an identification packet or configuration information from the wireless power receiver;

receive by the wireless power transmitter a control error packet from the wireless power receiver; and drive by the wireless power transmitter the power transfer unit using one of the full-bridge and the half-bridge based on whether or not the wireless power receiver corresponds to a medium power receiver or a low power receiver, informed by the wireless power receiver.

\* \* \* \* \*